(12) United States Patent
Bartling

(10) Patent No.: US 12,321,451 B2
(45) Date of Patent: Jun. 3, 2025

(54) LIVE ATTACK SHADOW REPLAY OF SOFTWARE

(71) Applicant: Arm Limited, Cambridge (GB)

(72) Inventor: Michael Bartling, Austin, TX (US)

(73) Assignee: ARM LIMITED, Cambridge (GB)

( * ) Notice: Subject to any disclaimer, the term of this patent is extended or adjusted under 35 U.S.C. 154(b) by 198 days.

(21) Appl. No.: 18/186,454

(22) Filed: Mar. 20, 2023

(65) Prior Publication Data
US 2024/0320332 A1    Sep. 26, 2024

(51) Int. Cl.
*G06F 21/53*    (2013.01)
*G06F 21/56*    (2013.01)

(52) U.S. Cl.
CPC ............ *G06F 21/563* (2013.01); *G06F 21/53* (2013.01)

(58) Field of Classification Search
CPC ....... G06F 21/53; G06F 21/563; G06F 21/566
See application file for complete search history.

(56) References Cited

U.S. PATENT DOCUMENTS

| | | | |
|---|---|---|---|
| 8,806,644 B1 * | 8/2014 | McCorkendale | ... H04L 63/1416 713/188 |
| 9,934,376 B1 * | 4/2018 | Ismael | .................. G06F 21/566 |
| 10,341,363 B1 | 7/2019 | Vincent et al. | |
| 10,482,243 B2 | 11/2019 | Kohavi et al. | |
| 2020/0310942 A1 * | 10/2020 | Nelson | ................ G06F 9/45508 |
| 2021/0081304 A1 * | 3/2021 | Masis | ................. G06F 9/45533 |
| 2023/0409715 A1 | 12/2023 | Nissim et al. | |

OTHER PUBLICATIONS

Combined Search and Examination Report under Sections 17 and 18(3) issued in UK Application No. GB2402711.2, mailed Aug. 30, 2024, 5 pages.
Singh, Jagsir, et al., "A Survey on Machine Learning-Based Malware Detection in Executable Files," Journal of Systems Architecture, Jan. 2021 (accessible Aug. 22, 2020), 24 pages, vol. 112, article 101861.

* cited by examiner

*Primary Examiner* — Trong H Nguyen
(74) *Attorney, Agent, or Firm* — Talem IP Law, LLP

(57) ABSTRACT

A live attack shadow replay can be performed at a shadow replay box that receives a snapshot of a computer program executed by an operating system of a device; mirrors an execution environment of the snapshot; determines a typical execution of the computer program comprising a first set of variables; performs a static analysis on the snapshot of the computer program to determine a second set of variables; determines a divergence between the first set of variables and the second set of variables; marks variables of the second set of variables that are associated with the divergence; replays a portion of the computer program corresponding to at least the snapshot; and monitors the marked variables of the second set of variables during the replaying of the portion of the computer program.

20 Claims, 4 Drawing Sheets

LIVE ATTACK SHADOW REPLAY OF SOFTWARE

BACKGROUND

Attacks, such as ones caused by malware, affect computer programs that run on computers and may cause significant damage to the computers and/or to finances, accounts, etc. that are managed online and are owned by users using the computers. It is often difficult to gather reliable representation of live attacks because typically, by the time an attack is identified, it may be too late to remediate the attack or find out additional information about the attack to try to prevent such attacks in the future.

Furthermore, recreating or reverse engineering an attack often takes a significant effort and may even be rendered fruitless when not performed in a time-sensitive manner.

Machine Learning (ML) techniques are being developed to analyze attacks and observe the behavior of such attacks (e.g., the effects of the attack on the computer program code and/or operation of the computing device). The results of these techniques can be used to create countermeasures. ML techniques often utilize a large, diverse, and clearly defined dataset (which are associated with attacks) to manually construct malicious sets of behaviors of attacks that have occurred in the past. However, the construction of the malicious sets of behaviors may be intractable given the frequency and tailored nature of attacks.

BRIEF SUMMARY

Live attack shadow replay is provided for reliably duplicating live attacks on software in a trusted and measurable environment. Through the described systems and methods, it can be possible to obtain the high-fidelity traces beneficial for applying ML techniques. In addition, it can be possible to perform the data collection (e.g., of the traces) at scale on many devices.

The described systems and methods can be used with monitoring systems (local and global) that can detect or identify a potential attack during execution of a software program. The triggering activity can vary depending on implementation and design, but once triggered, a snapshot of the program can be obtained, rolled back, and relaunched in a measurement environment that mirrors the current execution environment to replay the program including any variables and elements of the code that have been potentially tainted. In the measurement environment, it is possible to analyze behavior of the code and mark start and stop points for particular behaviors in the trace(s).

A method is provided that includes receiving, by a shadow replay box, a snapshot of a computer program executed by an operating system of a device, wherein the snapshot of the computer program comprises a sample of a memory space from a start time and at least one time period or function occurring prior to the start time of the sample and environment information; mirroring, by the shadow replay box, an execution environment of the snapshot using the environment information; determining, by the shadow replay box, a typical execution of the computer program comprising a first set of variables; performing, at the shadow replay box, a static analysis on the received snapshot of the computer program to determine a second set of variables; determining, at the shadow replay box, a divergence between the first set of variables and the second set of variables; marking variables of the second set of variables that are associated with the divergence; replaying, at the shadow replay box, a portion of the computer program corresponding to at least the snapshot; and monitoring, by the shadow replay box, the marked variables of the second set of variables during the replaying of the portion of the computer program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
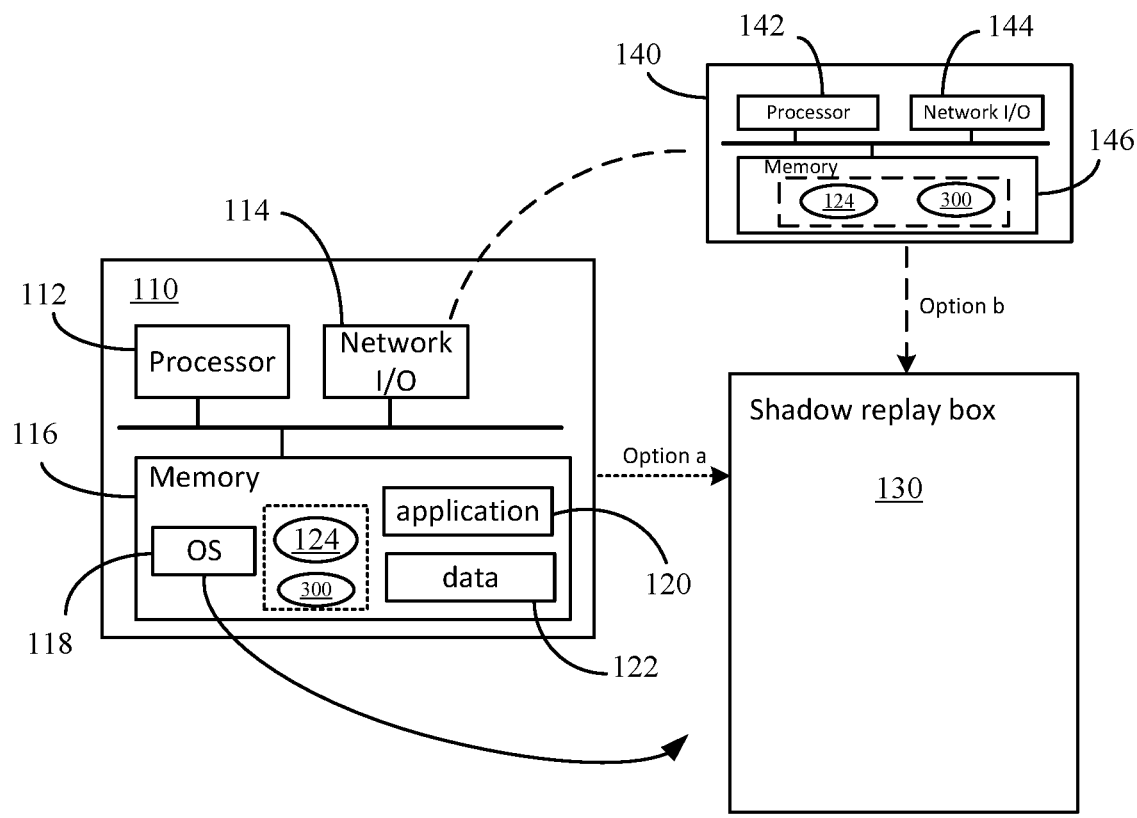
FIG. 1 illustrates an operating environment for a shadow replay box that replays, analyzes, and monitors a suspicious sample indicative of a potential attack on a computing device.

Live attack shadow replay is provided for reliably duplicating live attacks on software in a trusted and measurable environment. A live attack shadow replay box (also referred to as a shadow replay box) is provided that utilizes a trusted and measurable environment to replay computer attacks in an efficient manner and with high fidelity. The shadow aspect refers to the ability to duplicate the original environment. The box aspect refers to the ability to perform operations in isolation-away from affecting the original environment—and which enables secure/trusted environment. The environment is a measurable environment by incorporating measurements/analysis features so that operations can be evaluated using available analysis tools.

Through the described systems and methods, it can be possible to obtain the high-fidelity traces beneficial for applying ML techniques. In addition, it can be possible to perform the data collection (e.g., of the traces) at scale on many devices.

The described systems and methods can be used with monitoring systems (local process monitoring and higher level system monitoring) that can detect or identify a potential attack during execution of a software program. The triggering activity can vary depending on implementation and design, but once triggered, a snapshot of the program can be obtained, rolled back, and relaunched in a measurement environment that mirrors the current execution environment to replay the program including any variables and elements of the code that have been potentially tainted. In the measurement environment, it is possible to analyze behavior of the code and mark start and stop points for particular behaviors in the trace(s).

As described herein, the shadow replay box is activated upon a computing device receiving an alert indicative of a potentially dangerous activity or event affecting a computer program running on a computing device. An operating system of the computing device generates and sends a process snapshot to the shadow replay box. In some implementations, the shadow replay box is generated locally (i.e., on same computing device as that executing the computer program—and may use the same or a different processor when more than one processor is present). In some implementations, the shadow replay box is generated remotely (e.g., on a server on a network with the computing device executing the computer program or at a cloud service).

The shadow replay box then uses the information contained within the process snapshot to mirror the computer program that was running on the computing device and analyze benign paths of code that behave as they normally would without being attacked. The live attack shadow replay then compares the resulting analysis of benign paths of code to a snapshot of the operating system stack frame contained within the process snapshot associated with the computer program code that ran on the computing device (and which may be under attack). This comparison between the mirrored program and the snapshot is performed to find a divergence. The divergence indicates potentially tainted variables which are marked as important (e.g., flagged) and which have the ability to mutate and taint other variables based on access. The shadow replay box then monitors the important variables in order to learn further details regarding the behavior of the attack.

Figure 2:
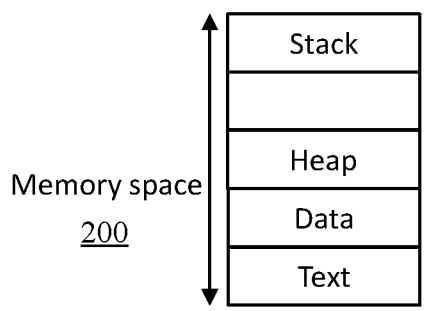
FIG. 2 is a conceptual representation of memory space.

FIG. 1 illustrates an operating environment 100 for a shadow replay box that replays, analyzes, and monitors a suspicious sample indicative of a potential attack on a computing device; and FIG. 2 is a conceptual representation of memory space.

Referring to FIG. 1, operating environment 100 includes a computing device 110 with a processor 112, network interface 114, and memory 116. Memory 116 stores an operating system (OS) 118 and applications, including software application 120. Data 122 is also stored on memory 116.

Although specific reference is made to a processor 112, the processor 112 can be any processing element such as, but not limited to, a CPU, graphics processing unit (GPU), microcontroller, or computing unit (e.g., multiplier-accumulator (MAC) unit with memory). In some cases, processor 112 can be implemented using application specific integrated circuits (ASICs), field programmable gate arrays (FPGA), microprocessors or other hardware circuitry.

Network interface 114 can include any suitable communications or network interface that enables computing device 110 to communicate with other devices including by wireless and/or wired means.

Memory 116 can include volatile and non-volatile memory hardware and can include built-in (e.g., system on a chip) and/or removable memory hardware. Examples of volatile memory include random-access memories (RAM, DRAM, SRAM). Examples of non-volatile memory include flash memory, various read-only memories (ROM, PROM, EPROM, EEPROM), phase change memory, magnetic and ferromagnetic/ferroelectric memories (MRAM, FeRAM). Although a single memory block is shown in the drawing, it should be understood that there are different levels/hierarchy of memory and components that may be used (e.g., cache memories, processor registers, system RAM, disk drives, secondary storage, etc.).

The OS 118 can load a program (e.g., application 120) into a memory space used by processor 112. For example, the OS 118 can identify a next available location of appropriate size in memory 116 (for the internal level of memory 116) and loads the program file of application 120 starting at that next available location. After the program is loaded into internal memory, the OS 118 directs the processor 112 to the memory address at which the program begins in order to begin execution of the program (i.e., as an instance of the program, which can be referred to as a process). The OS 118 can assign the process an identifier for keeping track of the process while it is running and properly responding to requests by the process for system resources. The running process of the program can be stored in the memory space 200 as shown in FIG. 2. When the process ends, the OS 118 can remove the program (and other related data) from the memory.

As illustrated in FIG. 2, the memory space 200 includes a stack frame, a heap frame, data, and other text that may be updated based on a computer program code that is running on the computing device. The text can include code segments of executable instructions of the program (e.g., the process). The data generally includes the variables used by the program. The stack frame assists with recursive functions. The heap frame supports dynamic memory allocation. The stack and heap frames provide chronological details of the computer program as it writes over the memory space.

Although not shown, a counter can be used to keep track of timing/steps of the running program.

Returning to FIG. 1, in some cases (e.g., Option a), memory 116 further stores instructions 124 for generating a container and/or virtual machine in order to spin up a shadow replay box 130 as well as instructions for performing method 300.

The shadow replay box 130 operates within software, has hypervisor support that is pre-existing, runs in a virtual machine (VM), is a container, and/or operates in a sandbox environment. For example, the shadow replay box 130 can be used to perform testing in a testing environment such as a sandbox. As another example, the shadow replay box 304 can be implemented on a virtual machine. A virtual machine virtualizes both the operating system kernel and the application layer. In another example, a platform such as Docker may be used in order to generate the mirrored execution environment. The Docker platform supports docker containers, which contain an application along with the associated dependency and configuration information. Docker containers run on top of the host operating system to provide isolated environments for running applications.

The shadow replay box 130 can be used to provide detailed instrumentation of potentially malicious code. The shadow replay box 130 can use existing monitoring techniques such as network traffic monitoring, system calls, dynamic taint tracking, program way pointing (e.g., using path profiling or debug infrastructure), or other sandboxing techniques. Alternatively, the shadow replay box 130 can leverage machine learning targeted data science techniques in order to prepare the samples for later training. Thus, the shadow replay box 130 can generate information that is useful for subsequent application of machine learning techniques in order to identify and monitor suspicious samples, as well as to create traces in order to better predict and stop malicious attacks from occurring.

In some cases (e.g., Option b), operating environment 100 includes a separate computing system 140 that receives information from the computing device 110 (e.g., via the network interface 114) to support generating the shadow replay box 130 (e.g., according to instructions 124 for generating a container and/or virtual machine and instructions for performing method 300). Computing system 140 includes a processor 142, network interface 144, and memory 146. Computing system 140 includes or operates a secure environment. In some cases, computing system 140 is part of a cloud-based system. Accordingly, any suitable apparatus may be used to generate and operate the shadow replay box 130.

Information of the process as stored in the memory space 200 can be available for use by the described methods since the operating system 118 can provide the information in the memory space 200 to the shadow replay box 130. This is possible regardless of which underlying hardware is used to run the shadow replay box 130.

Although not shown in FIG. 1, monitoring engines/systems can be provided as part of computing device 110 and/or computing system 140 (or as yet another standalone system that can be in communication with computing device 110). A monitoring engine/system can be used to identify a potential attack or malicious behavior acting on the computing device and/or trigger alerts.

In addition, although not shown in FIG. 1, multiple shadow replay boxes can be spun up to address different alerts and/or potential attacks identified at computing device 110. Each shadow replay box can perform method 300.

Figure 3:
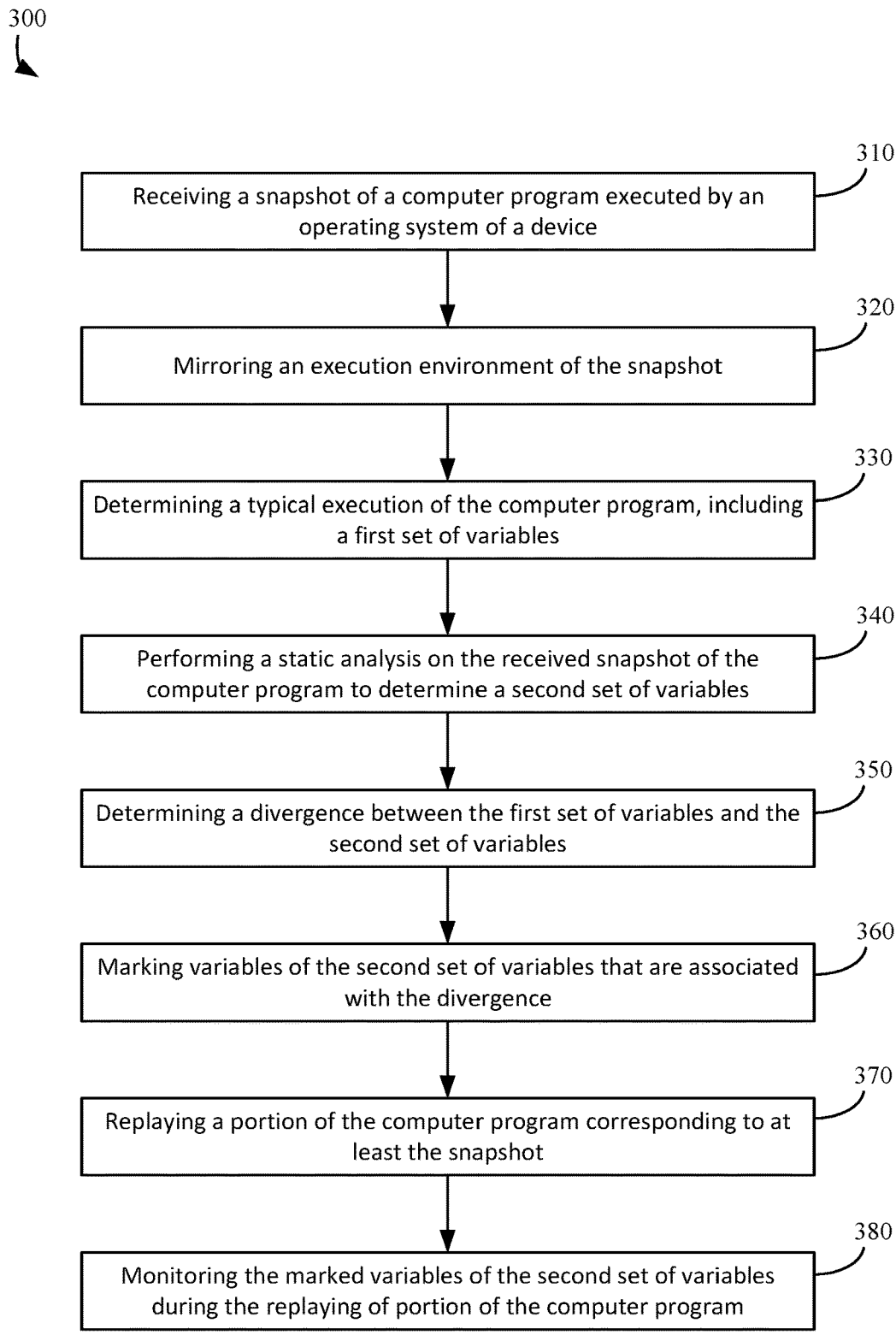
FIG. 3 illustrates a method to identify and monitor suspicious samples in a computer program in a shadow replay box.

FIG. 3 illustrates a method to identify and monitor suspicious samples in a computer program in a shadow replay box. Method 300 can be performed in response to an alert indicating a potential attack or malicious behavior acting on a computing device (e.g., computing device 110 of FIG. 1). Referring to FIG. 3, method 300 includes receiving (310), by a shadow replay box (e.g., shadow replay box 130), a snapshot of a computer program executed by an operating system (e.g., OS 118) of a device (e.g., computing device 110). In some implementations, the operating system (e.g., OS 118) migrates the snapshot to the shadow replay box in response to receiving an alert generated by a monitoring engine identifying a potentially suspicious event of the computer program.

The snapshot of the computer program (e.g., "process snapshot") includes a sample of a memory space (e.g., memory space 200) from a start time and at least one time period or function occurring prior to the start time of the sample, which combined can be referred to as a "memory space snapshot". The snapshot can be a stack frame rollback of the memory space managed by the operating system (e.g., OS 118). In this manner, the stack frame rollback can include the at least one time period or function occurring prior to the start time of the sample. The snapshot of the computer program (e.g., the "process snapshot") further includes environment information (e.g, "environmental snapshot"). The environment information includes information of files that are read and/or written to, environment variables, data present in standard IO, application arguments, and potentially system call information. Thus, a process snapshot includes information of accessed memory addresses (and variables) and files that are read and/or written to.

In some cases, the snapshot is associated with one or more secrets and the shadow replay box can further receive the one or more secrets, securely manage the one or more secrets, and dispose of the one or more secrets when operations at the shadow replay box are completed (e.g . . . after operation 380 described below). By guarantying that the secrets are expunged, trust can be established between the shadow replay box 130 and computing devices. Computing devices typically have secret information that is used to establish trusted communication. As the shadow replay box 130 does not read and does not store the secrets, computing devices can ensure that the secrets will not be leaked or used for some malicious purpose. Additionally, the shadow replay box 130 itself, which may be ephemeral, may cease to exist after the traces have been generated (and stored). The secrets may be deleted before or at the time that the shadow replay box 130 ceases to exist.

Method 300 further includes mirroring (320), by the shadow replay box (e.g., shadow replay box 130), an execution environment of the snapshot (e.g., using the environment information). The execution environment includes the components that are used together with the application code to make the complete system, for example, information about the device and operating system, as well as the information about resources used by the application code (e.g., the files that are read and/or written to). The process (e.g., idle thread or idle process) of the computer program from the snapshot is loaded into the mirrored execution environment. By there being a program counter associated with the process, it is possible to know where the program started relative to where the program is currently (e.g., where the thread or program is paused).

Method 300 further includes determining (330), by the shadow replay box (e.g . . . shadow replay box 130), a typical execution of the computer program, including a first set of variables. The typical execution represents standard operation of the computer program. The determining (330) of the typical execution of the computer program can include obtaining an image of a resulting memory space as a result of performing the computer program under benign conditions; and performing a static analysis on the image of the resulting memory space to determine the first set of variables.

Method 300 further includes performing (340), at the shadow replay box (e.g., shadow replay box 130), a static analysis on the received snapshot of the computer program to determine a second set of variables.

Method 300 further includes determining (350), at the shadow replay box (e.g., shadow replay box 130), a divergence between the first set of variables and the second set of variables. The divergence can be determined by comparing the first set of variables with the second set of variables.

Method 300 further includes marking (360) variables of the second set of variables that are associated with the divergence. The marking can be applied before and after a potential variable of interest (e.g . . . start and stop points in a trace).

Method 300 further includes replaying (370), at the shadow replay box (e.g., shadow replay box 130), a portion of the computer program corresponding to at least the snapshot. The replay can be performed any number of times and with different instrumentation if desired.

Method 300 further includes monitoring (380), by the shadow replay box (e.g., shadow replay box 130), the marked variables of the second set of variables during the replaying of the portion of the computer program. In some cases, the monitoring (380) of the second set of variables marked as important includes performing a static analysis on injected variables injected into the mirrored execution environment.

In some implementations, the method can further include performing instrumentation during the monitoring of the marked variables of the second set of variables. The instrumentation can include binary instrumentation. Binary instrumentation can include the process of introducing new code into a computer program without changing its overall behavior. In some cases, the instrumentation can include monitoring system calls and/or network traffic.

As mentioned above, multiple shadow replay boxes can be spun up to address different alerts and/or potential attacks identified at computing device 110. Each shadow replay box can perform similar operations as method 300. For example, a second shadow replay box can receive a second snapshot of the computer program executed by the operating system of the device, mirror an execution environment of the second snapshot, determine the typical execution of the computer program including the first set of variables, perform a static analysis on the second snapshot of the computer program to determine a corresponding second set of variables; determine a corresponding divergence between the first set of variables and the corresponding second set of variables; mark variables of the corresponding second set of variables that are associated with the corresponding divergence; replay a corresponding portion of the computer program corresponding to at least the second snapshot; and monitor the marked variables of the corresponding second set of variables during the replaying of the corresponding portion of the computer program. Instrumentation can be performed at the second shadow replay box on the replayed portion of the computer program.

In addition to the ability to spin up multiple shadow replay boxes, multiple process snapshots can be sent to a single shadow replay box. Indeed, shadow replay box 130 can receive not just one process snapshot, but multiple process snapshots. The multiple process snapshots can reflect scenarios where multiple threads and/or processes (including child processes) are occurring at the computing device 110. The context and hierarchy of the multiple processes are then mirrored by the shadow replay box in a same execution environment (e.g., as if in the same operating system).

Figure 4:
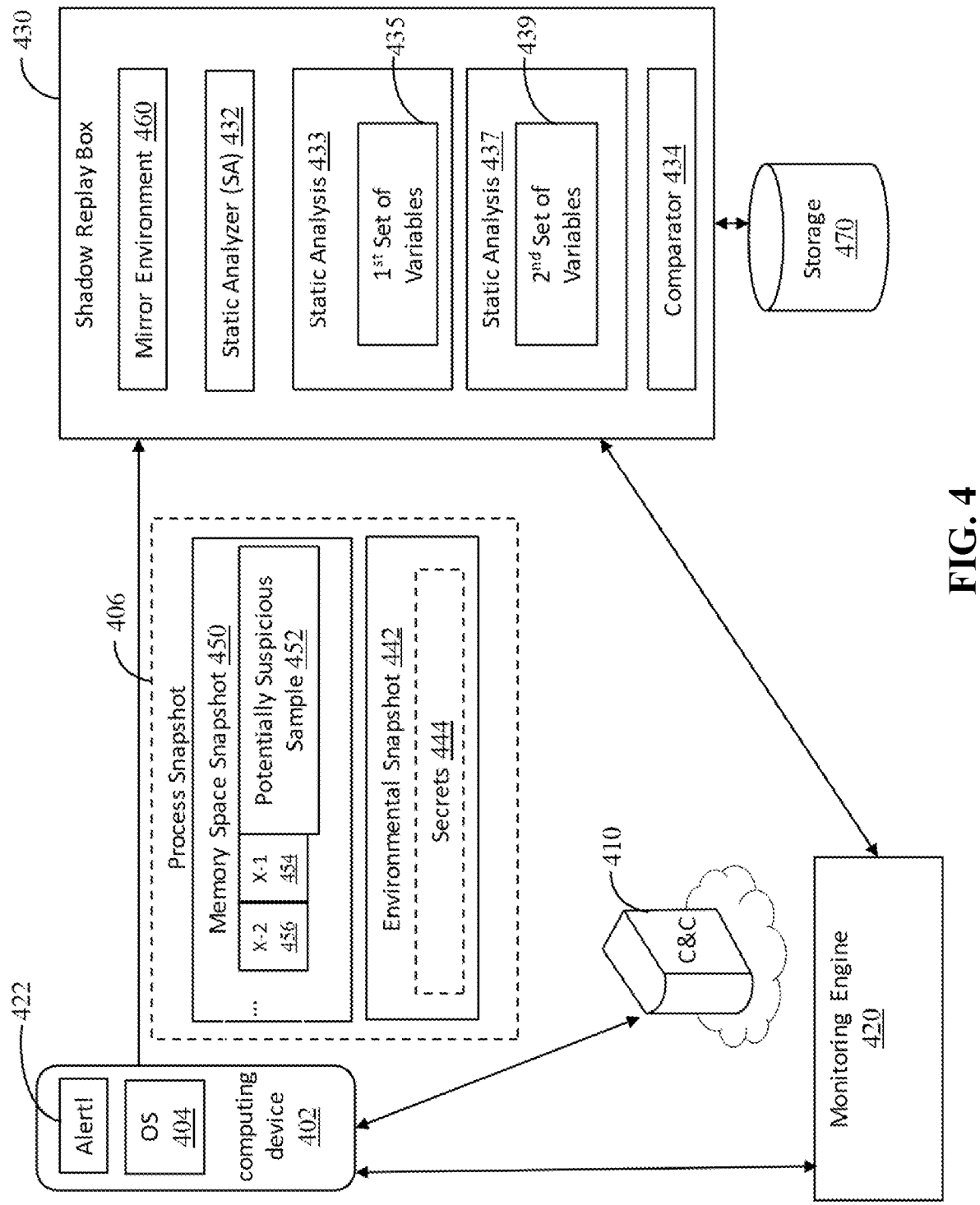
FIG. 4 illustrates an example scenario of a live attack shadow replay.

FIG. 4 illustrates an example scenario of a live attack shadow replay. Referring to the illustrative scenario shown in FIG. 4, a computing device 402 may be engaging in an activity such as an online activity that involves use of a computer program under control of an operating system (OS) 404 running on the computing device 402 (e.g., as the process from which process snapshot 406 is obtained). For example, the computing device 402 may engage in the activity when a user using the computing device 402 is browsing the Internet (not depicted). The computing device 402 may be running a computer program which may be compromised. For example, a command-and-control (C&C) server 410 may transmit a virus, malware, and/or other improper data that affects the computer program running on the computing device 402. The C&C server 410 may be a cloud-based server or other server which establishes communication with the computing device 402.

The presence of an attack can be detected through any available means. For example, in many cases, the computing device 402 is in communication with a monitoring engine 420 which may be internal to the computing device 402, external to the computing device 402, reachable via a network by the computing device 402, reachable locally by the computing device 402, etc. The monitoring engine 420 monitors the computer programs running on the computing device 402 and identifies potentially suspicious activities and events. The monitoring engine 420 may be a virus detection system, for example, providing antivirus protection, a virtual private network (VPN) malware protection, etc.

When the monitoring engine 420 detects suspicious activity (such as that transmitted by the C&C server 410), the monitoring engine 420 emits a warning in the form of an alert 422 to the computing device 402. The alert 422 is triggered by the monitoring engine 420 detecting suspicious activity and can be in any suitable format and include any appropriate information. In response to the alert 422, a shadow replay box 430 such as described with respect to shadow replay box 130 of FIG. 1 can be spun up (or otherwise generated).

For example, the shadow replay box 430 can be spun up as a container upon the receipt of the alert 422. One or more shadow replay boxes may spin up as respective containers in responses to respective alerts. The shadow replay box(es) may be ephemeral and may last for a temporary time period and may cease to exist when their final task (e.g., to find a third trace, as explained herein below) is finished.

Once the shadow replay box 430 is spun up, the OS 404 packages the target process(es) as process snapshot(s) 406 and issues migration of the process snapshot(s) 406, including environmental snapshot 442 with the system environment information and memory space snapshot 450 of the computer program stored in the memory space, to the shadow replay box 430. Program inputs can be reflected in the memory space snapshot 450 when maintained as local variables or in the environmental snapshot 442 when passed to the program via system calls.

Secrets 444, which may be private or secret information such as keys that are associated with the computing device 402, may also be migrated along with the process snapshot 406 over from the computing device 402 to the shadow replay box 430. The migration is performed in a secure manner.

The memory space snapshot 450 includes a potentially suspicious sample 452 of memory space from a particular start time that includes activity that triggered the alert 422. The memory space snapshot 450 also includes one, two, or more time periods or functions that took place prior to the occurrence of the potentially suspicious sample 452 in the OS 404.

As an illustrative example, the first prior time period or function 454 is labeled as "X−1" and the second prior time period or function 456 is labeled as "X−2". Suppose that the alert 422 occurring at a particular time corresponds to occurrence of a suspicious activity at "X". That is, when the alert 422 is received, there is information in the memory space that includes operations of the suspicious activity. That information, along with information that occurred a time period or function prior to X is captured in the memory space snapshot 450. With this information, a rollback to an earlier time period can be performed on the memory space snapshot 450 at the shadow replay box 430.

The environmental snapshot 442 includes information about computing device 402 and the operating environment of the process, including but not limited to, privileges of the OS 404, inputs/functions of the computer program, system libraries of the OS 404, the kernel version and type of the OS 404 and other information relating to the OS 404. That is, the environmental snapshot 442 can include information of all files that are read and/or written to.

As described above, upon receipt of the alert 422, the OS 404 prepares and generates the process snapshot(s) 406 for migration to the shadow replay box 430. The shadow replay box 430 may spin up on-demand (e.g., in response to the migration) or the shadow replay box 430 may already exist. Method 300 can then be performed.

For example, the shadow replay box 430 receives the process snapshot 406 (including memory space snapshot 450 and environmental snapshot 442) from the OS 404 of the computing device 402.

The shadow replay box 430 then mirrors the execution environment of the OS 404 based on the received process snapshot 406, including environment information from the environmental snapshot 442 (e.g., as mirror environment 460).

In some cases, the shadow replay box 430 recreates the expected path and behavior the computer program code should have taken. That is, the shadow replay box 430 can execute a process to identify the expected path and behavior, including where and how instruction branches are handled and memory is read and written. The shadow replay box 430 can generate the expected path for a benign operation (e.g., as a typical execution). The typical execution represents the standard operation of the computer program and can establish a replica of the memory space when no potentially suspicious activity occurred and when the computer program code ran as it should have without any alterations.

The shadow replay box 430 can include a static analyzer (SA) 432 and a comparator 434. The static analyzer 432 may perform one or more types of static analyses mentioned herein. In other implementations, two or more static analyzers may be used to perform static analysis to generate different traces. In an example implementation, the static analyzer 432 performs a static analysis on the mirror environment 460. For example, the static analyzer 432 can perform a linear analysis scan in order to identify a set of variables of interest in the recreated environment(s).

In the illustrative implementation, the variables that are identified in a static analysis 433 of the mirror environment 460 of the typical execution can be referred to as a first set of variables 435. The typical execution reflects the environment during which no suspicious activities or samples would have occurred. That is, the typical execution reflects the execution of the program when no alerts were issued and no potentially suspicious activities or events occurred. The result of the first static analysis 433 by the shadow replay box 430 can be referred to as a first trace.

The first trace is indicative of how the computer program running on the computing device 402 should have behaved (e.g., what code should exist in memory space).

The shadow replay box 430 performs a second static analysis 437 (e.g., using a static analyzer 432) on the memory space snapshot 450 by performing a linear analysis scan in order to identify a different set of variables (that potentially differ from the first set of variables 435). These different variables are referenced herein as a second set of variables 439. The result of the second static analysis 437 can be referred to as a second trace. Thus, the first trace provides a first set of variables that are reflective of the computer program running as it normally would have, and the second trace provides a second set of variables which are potentially tainted due to a suspicious event occurring in the computer program.

Figure 5:
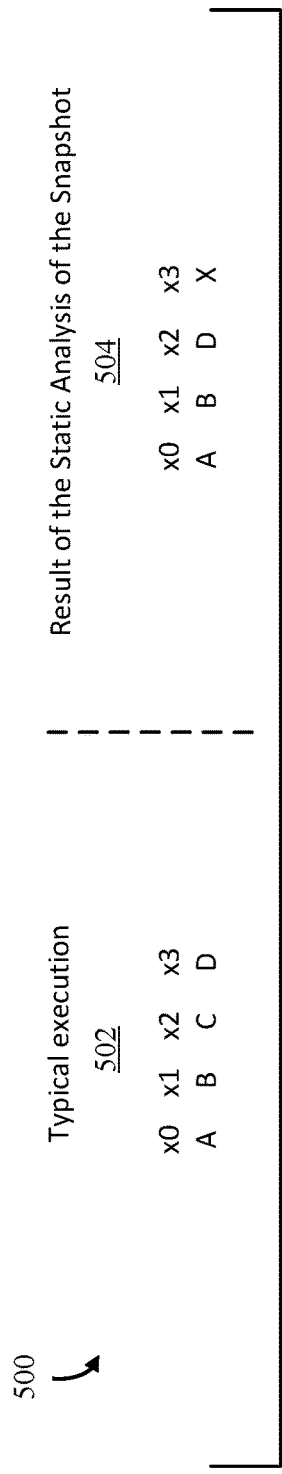
FIG. 5 illustrates a textual comparison between a typical execution environment and a result of the static analysis of the snapshot.
Figure 6:
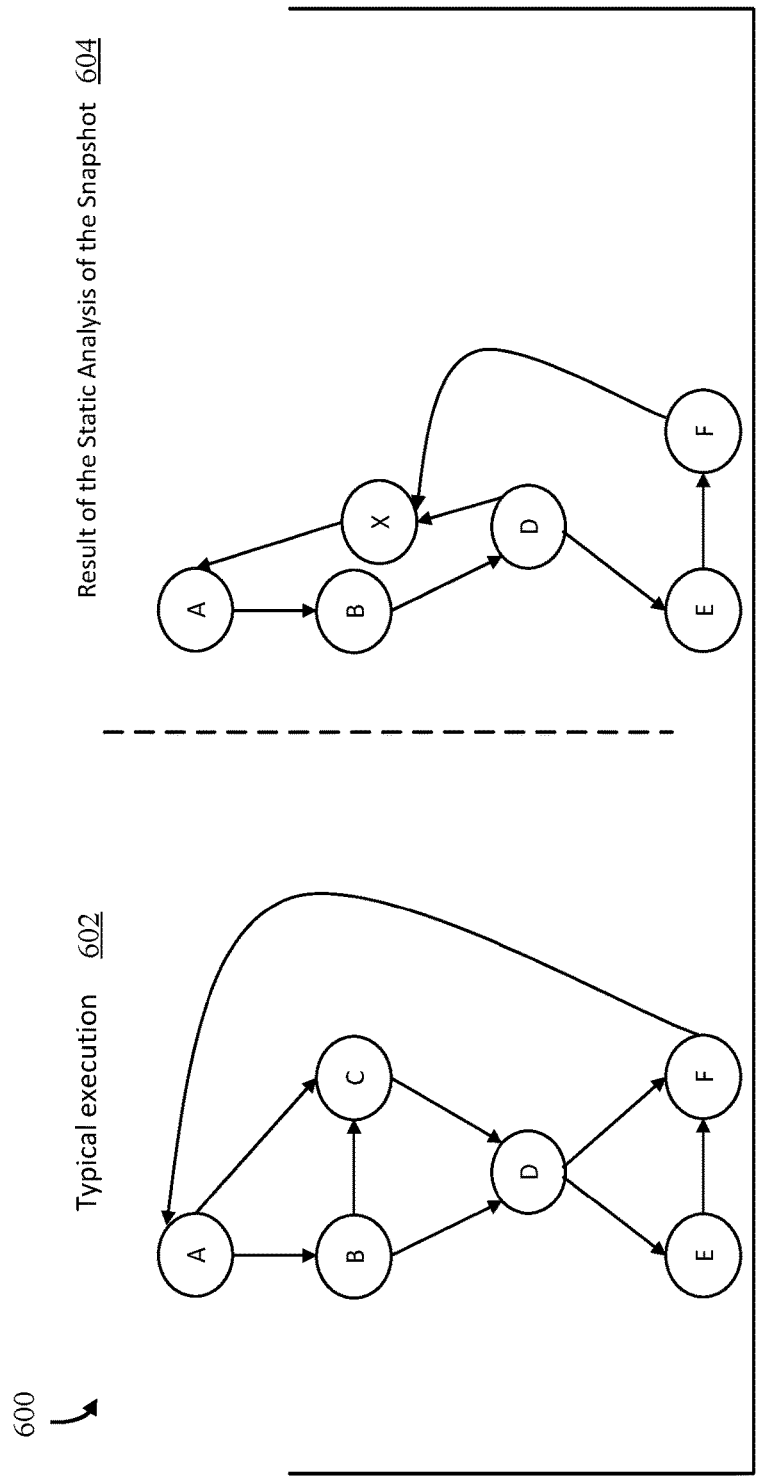
FIG. 6 illustrates a graphical comparison between a typical execution environment showing benign paths and a result of the static analysis of the snapshot showing potentially tainted paths.

The shadow replay box 430 then uses comparator 434 to determine a divergence between the first set of variables 435 and the second set of variables 439 as a result of comparing the two sets of variables. Example comparisons are illustrated in FIGS. 5 and 6. In response to determining the divergence, the shadow replay box 430 marks variables of the second set of variables that are associated with the divergence as important variables. The important variables may be determined to be malicious or tainted variables that may cause harm to the computing device 402. Such variables differ from the first set of variables and thus, the difference may be caused by malicious attacks, malware, etc., submitted by the C&C server 410.

For example, in one implementation, if the comparator 434 determines there is not a divergence (or enough of a divergence, for example, when changes account for a small percentage, such as a 3% deviation) between the first set of variables 435 and the second set of variables 439, it is possible that the alert 422 was a false alarm and did not identify any malicious activity. However, when the comparator 434 determines there is a divergence between the first set of variables 435 and the second set of variables 439, in response to making such a determination, the shadow replay box 430 marks the divergent variables of the second set of variables 439 as important. The marking of these variables as important allows the shadow replay box 430 to monitor these variables and perform further analysis.

Once important variables are marked, it is possible to perform higher level analysis on the potential attack. For example, the shadow replay box 430 replays a portion of the computer program corresponding to at least a portion of the process snapshot. The shadow replay box 430 can monitor the computer program's behavior by focusing on the marked variables in a safe and trusted environment that cannot cause harm (as the environment is a virtually recreated environment). The shadow replay box 430 can perform instrumentation by injecting different variables and can then run a third trace based on determining the behavior of the computer program in view of the different variables which can be injected in the mirrored execution environment. The third trace may run as a separate process within the shadow replay box 430 and a static analysis may be performed on the resulting memory frame.

The first, second and/or third traces may be stored in storage 470. The traces may be used by ML in order to better predict and combat future attacks. ML can use the traces to reconstruct previous attacks and predict future attacks and try to prevent malicious activity from occurring.

After the traces have been generated and stored, the secrets 444 may be expunged and deleted.

In some cases, the alert 422 may provide a warning that is depicted to a user operating the computing device 402 on a graphical user interface. For example, the alert 422 may provide a graphical, audio, and/or textual display representation that states "dangerous state encountered" or issue another warning to let the user know that some suspicious activity has occurred. The monitoring engine 420 may or may not take action to rectify the potential effects of the suspicious activity.

In an optional implementation, the monitoring engine 420 establishes bilateral communication with the shadow replay box 430, via a network. In such an implementation, monitoring engine 420 may optionally send the same or a different alert to the shadow replay box 430 as the one received by the computing device 402 to warn the shadow replay box 430 that a potential attack has been detected. The computing device 402 may be identified by a secure identification code contained within the alert, or an identity of the computing device 402 may not be provided.

By using an alert in order to pin-point where a potential malicious attack or activity occurred, the second and/or third traces have a higher fidelity of providing meaningful traces of malicious activity as the alert is issued at the time, or shortly after the time of the occurrence of the malicious activity. In fact, the traces may be generated in some instances while the attack is occurring in real-time (or a slight deviation of the time after) and thus, the capture and determination of traces of the attack may be considered a capture of a live attack. Such traces are more reliable than other methods which cannot capture the potentially malicious activity as it's happening or shortly after it occurred. By capturing and migrating the process while the attack is occurring or has recently occurred in real-time (or a slight deviation of the time after) and having the shadow replay box replay what happened to regenerate the traces, a faster and more accurate result is obtained as opposed to waiting a long period of time after the attack occurred and the C&C server is no longer in communication with the computing device it attacked. High fidelity results in faster and more accurate traces which better allows identification of the C&C server and/or similar attacks and prevention of such malicious attacks in the future.

FIG. 5 illustrates a textual comparison between a typical execution environment and a result of the static analysis of the snapshot. Referring to FIG. 5, a comparison 500 is shown for textual representations of predicted variables in the typical execution environment 502 on the left side and potentially tainted variables obtained as a result of the static analysis of the snapshot 504 on the right side. As shown, it can be seen that there is a divergence in the variables x2 and x3 between the typical execution environment 502 and the result produced by the static analysis of the snapshot 504.

FIG. 6 illustrates a graphical comparison between a typical execution environment showing benign paths and a result of the static analysis of the snapshot showing potentially tainted paths. Referring to FIG. 6, a comparison 600 is shown for a graphical representation of the typical execution environment showing benign paths 602 on the left side and a graphical representation of a result of the static analysis of the snapshot showing potentially tainted paths 604 on the right side. The paths are constructed using control flow graphs.

A control flow graph is associated with code of a computer program. The control flow graph is constructed using path profiling. In path profiling, every path of execution code in the computer program is assigned a unique ID. For example, integers may be generated and used to generate a unique path for every possible path in the code of the computer program. The path profiling can be performed, for example, using the Ball and Larus path profiling algorithm. The Ball and Larus path profiling algorithm takes, as input, the control flow graph for a program. Then, for any arbitrary path in the control flow graph, the Ball and Larus path profiling algorithm gives, as an output, a path identifier for that path. Additionally, the Ball and Larus path profiling algorithm can determine the frequency of each path in the program (e.g., by counting how often each path through a function or program is taken at runtime).

As shown, when comparing the two paths, a divergence can be seen.

In some cases, the taint analysis both tracks code execution paths and any variables that get read from or written to, e.g., "x=5; y=x; z=2*y". If x is tainted by the malicious execution path, then y and z are also updated to be tainted.

The comparisons of a graphical and/or a textual representation of the code and the path of executed code in the computer program (such as illustrated by FIGS. 5 and 6) can be made by the system operating the shadow replay box (e.g., by comparator 434).

Using the comparator to determine a divergence between the first set of variables and the second set of variables can provide useful information about the attack that occurred which yielded the second set of variables.

Developers can utilize the shadow replay box in order to try to analyze attacks in order to better understand them and even protect against them in the future.

Suppose that developers provide some or all paths in a computer program that are instrumented, and intentionally injected exploitable code to entice attackers to use it, when no attack is made, the exploitable code would remain untouched. The shadow replay box recognizes when and where an attack is taking place as the exploitable code is affected. After recognizing that an attack is underway (based on the behavior of the exploitable code), parts of the computer software that includes a corresponding potentially tainted sample (and the corresponding heap and stack frame in the OS) can be pruned and dumped.

Next, the shadow replay box can perform a simple static analysis to mark the tainted variables as important and determine where the divergence in the variables occurs, inject some information (e.g., workload begin/end calls), clone the target binary, and inject the window calls. Finally, a measurement environment can be spun up and analyze the tainted variables as they effect the computer program that may run in the shadow replay box environment. Any secrets are also passed form the computing device to the shadow replay box. No sensitive or private data is leaked as the shadow replay box does not perform a live execution of the computer program code.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
   receiving, by a shadow replay box, a snapshot of a computer program executed by an operating system of a device, wherein the snapshot of the computer program comprises:
      a sample of a memory space from a start time and at least one time period or function occurring prior to the start time of the sample; and
      environment information;
   mirroring, by the shadow replay box, an execution environment of the snapshot using the environment information;
   determining, by the shadow replay box, a typical execution of the computer program comprising a first set of variables;
   performing, at the shadow replay box, a static analysis on the received snapshot of the computer program to determine a second set of variables;
   determining, at the shadow replay box, a divergence between the first set of variables and the second set of variables;
   marking variables of the second set of variables that are associated with the divergence;
   replaying, at the shadow replay box, a portion of the computer program corresponding to at least the snapshot; and
   monitoring, by the shadow replay box, the marked variables of the second set of variables during the replaying of the portion of the computer program.

2. The method of claim 1, further comprising:
   performing instrumentation during the monitoring of the marked variables of the second set of variables.

3. The method of claim 2, wherein the instrumentation includes binary instrumentation.

4. The method of claim 2, wherein the instrumentation comprises monitoring system calls.

5. The method of claim 2, wherein the instrumentation comprises monitoring network traffic.

6. The method of claim 1, wherein the determining, by the shadow replay box, the typical execution of the computer program comprises:
   obtaining an image of a resulting memory space as a result of performing the computer program under benign conditions; and
   performing a static analysis on the image of the resulting memory space to determine the first set of variables.

7. The method of claim 1, wherein the snapshot is associated with one or more secrets, the method further comprising:
   receiving, at the shadow replay box, the one or more secrets;
   securely managing the one or more secrets; and
   disposing of the one or more secrets after the monitoring of the marked variables of the second set of variables is completed.

8. The method of claim 1, wherein the operating system migrates the snapshot to the shadow replay box in response to receiving an alert generated by a monitoring engine identifying a potentially suspicious event of the computer program.

9. The method of claim 1, wherein the monitoring the marked variables of the second set of variables comprises performing a static analysis on injected variables injected into the mirrored execution environment.

10. The method of claim 1, further comprising:
    receiving, by the shadow replay box, a second snapshot of a second thread or child process of the computer program executed by the operating system of the device, wherein the shadow replay box mirrors the execution environment including with respect to the second snapshot.

11. An apparatus comprising:
    a processor;
    a memory; and
    instructions stored on the memory that when executed by the processor direct the processor to:
       generate a shadow replay box;
       receive, by the shadow replay box, a snapshot of a computer program executed by an operating system of a device, wherein the snapshot of the computer program comprises:
          a sample of a memory space from a start time and at least one time period or function occurring prior to the start time of the sample; and
          environment information;
       mirror, by the shadow replay box, an execution environment of the snapshot using the environment information;
       determine, by the shadow replay box, a typical execution of the computer program comprising a first set of variables;
       perform, at the shadow replay box, a static analysis on the received snapshot of the computer program to determine a second set of variables;
       determine, at the shadow replay box, a divergence between the first set of variables and the second set of variables;
       mark variables of the second set of variables that are associated with the divergence;
       replay, at the shadow replay box, a portion of the computer program corresponding to at least the snapshot; and
       monitor, by the shadow replay box, the marked variables of the second set of variables during the replaying of the portion of the computer program.

12. The apparatus of claim 11, further comprising instructions that direct the processor to:
    perform, by the shadow replay box, instrumentation during the monitoring of the marked variables of the second set of variables.

13. The apparatus of claim 12, wherein the instrumentation includes binary instrumentation.

14. The apparatus of claim 12, wherein the instrumentation comprises monitoring system calls.

15. The apparatus of claim 12, wherein the instrumentation comprises monitoring network traffic.

16. The apparatus of claim 11, wherein the instructions to determine, by the shadow replay box, the typical execution of the computer program direct the processor to:
    obtain, at the shadow replay box, an image of a resulting memory space as a result of performing the computer program under benign conditions; and
    perform, by the shadow replay box, a static analysis on the image of the resulting memory space to determine the first set of variables.

17. The apparatus of claim 11, wherein the snapshot is associated with one or more secrets, the apparatus further comprising instructions that direct to processor to:
    receive, at the shadow replay box, the one or more secrets;
    securely manage the one or more secrets; and
    dispose of the one or more secrets after the monitoring of the marked variables of the second set of variables is completed.

18. The apparatus of claim 11, wherein the operating system migrates the snapshot to the shadow replay box in response to receiving an alert generated by a monitoring engine identifying a potentially suspicious event of the computer program.

19. The apparatus of claim 11, wherein the instructions to monitor the marked variables of the second set of variables direct the processor to perform, by the shadow replay box, a static analysis on injected variables injected into the mirrored execution environment.

20. The apparatus of claim 11, further comprising instructions that direct the processor to:
    receive, by the shadow replay box, a second snapshot of a second thread or child process of the computer program executed by the operating system of the device, wherein the shadow replay box mirrors the execution environment including with respect to the second snapshot.

\* \* \* \* \*